United States Patent [19]
Herz et al.

[11] 3,859,337
[45] Jan. 7, 1975

[54] ETHYLENEDIAMINETETRAACETIC ACID ANHYDRIDE DERIVATIVES

[75] Inventors: Jack L. Herz, Scarsdale, N.Y.; Stanley Chaberek, Westport, Conn.

[73] Assignee: Stauffer Chemical Company, New York, N.Y.

[22] Filed: Apr. 11, 1973

[21] Appl. No.: 350,247

Related U.S. Application Data

[63] Continuation of Ser. No. 832,430, June 11, 1969, abandoned.

[52] U.S. Cl.... 260/500.5 H, 204/52 R, 260/293.51, 260/293.85, 204/DIG. 2, 260/293.87, 260/294.8 R, 252/8.1, 260/306.7, 260/309.6, 252/8.8, 252/82, 260/429 R, 252/89, 260/332.2, 260/429 J, 252/175, 260/429.7, 260/431, 252/DIG. 11, 260/438.1, 260/439 R, 260/2 P, 260/440, 260/446, 260/75 N, 260/448.2 N, 260/465.4, 260/78 A, 260/478, 260/481 R, 260/79.7, 260/482 R, 260/502.6, 260/112.5, 260/514 R, 260/534 E, 260/124 A, 260/551 R, 260/945, 260/209 R, 260/DIG. 4, 260/9, 260/210 R, 260/21, 260/24, 260/212, 260/224, 260/239 R, 260/244 R, 260/247, 260/247.1, 260/247.2 A, 260/268 R, 260/269, 260/290 R

[51] Int. Cl........................ C07c 103/30, C23b 5/18
[58] Field of Search............................. 260/500.5 H

[56] References Cited
UNITED STATES PATENTS

| | | | |
|---|---|---|---|
| 3,170,953 | 2/1965 | Lashua.................... | 260/500.5 H |
| 3,282,986 | 11/1966 | Kaczka.................... | 260/500.5 H |
| 3,345,344 | 10/1967 | Fetscher et al............ | 260/500.5 H |
| 3,419,603 | 12/1968 | Lipowski et al........... | 260/500.5 H |
| 3,480,392 | 11/1969 | Carlos..................... | 260/500.5 H |

*Primary Examiner*—Joseph E. Evans

[57] ABSTRACT

Novel derivatives of ethylenediaminetetraacetic acid anhydride are provided and such derivatives are obtained by directly reacting the anhydride with compounds having a hydrogen atom replaceable by an acyl function. The products thus obtained are useful as chelating agents, coagulants, antistatic agents, etc.

2 Claims, No Drawings

ETHYLENEDIAMINETETRAACETIC ACID ANHYDRIDE DERIVATIVES

CROSS REFERENCE TO RELATED APPLICATIONS

The present application is a continuation of U.S. Ser. No. 832,430, filed June 11, 1969 and now abandoned.

FIELD OF THE INVENTION

The present invention relates to novel derivatives of ethylenediaminetetraacetic acid anhydride (hereinafter also referred to as EDTA anhydride) which are obtained by directly reacting the aforementioned anhydride with a wide variety of substances, the resulting products having a broad spectrum of industrial applications.

SUMMARY OF THE INVENTION

The novel derivatives of EDTA anhydride are obtained by a procedure involving direct reaction of ethylenediaminetetraacetic acid anhydride with suitable compounds and illustratively, amines, hydroxylamines, hydrazines, amides, alcohols, phenols, mercaptans, and the like. Suitable amines include ammonia, N-substituted alkylamines such as N-methylamine, N-ethylamine, and the like; N-substituted arylamines such as aniline, p-toluidines, α-naphthylamine, 1, 2, 3, 4-tetrahydroquinoline, and the like; typical hydroxylamines include hydroxylamine per se, N-substituted hydroxylamines such as N-phenylhydroxylamine, N-butylhydroxylamine, and the like; illustrative hydrazines are N,N-and N,N'-dialkylhydrazines, i.e., N,N-dimethylhydrazine, N,N'-dimethylhydrazine and the like; suitable amides include acetamide, formamide, propionamide, and the like; illustrative alcohols are benzyl alcohol, glycolic acid, and the like; suitable alkanolamines are N,N-dimethylethanolamine, diethanolamine, triethanolamine, and the like.

About 2 moles of the reactant, i.e., the amine, hydroxylamine, hydrazine, amide, alcohol, phenol, mercaptan, or the like, are generally used for each mole of EDTA anhydride. Where monosubstituted derivatives are desired, such derivatives are obtained by reacting only about 1 mole of the amine, hydrazine, or other reactants, (followed by hydrolysis of the remaining anhydride function) thereby obtaining EDTA monoamides, EDTA monoesters, and the like.

Generally, derivatives of EDTA anhydride are obtained by direct reaction of EDTA anhydride with suitable substances, that is, compounds having a hydrogen atom replaceable by an acyl function including compounds containing a nitrogen, oxygen, phosphorus or sulfur atom. The resulting derivatives are characterized by a wide variety of uses such as, for example, chelating agents, perservatives, stabilizers, coagulants, flame retardants, detergent builders, agricultural chemicals, and the like.

DESCRIPTION OF THE PRIOR ART

British Patent Application No. 1,077,458 describes the use of certain esters of ethylenediaminetetraacetic acid in stabilizing such autooxidizable materials as fats and oils of animal and vegetable origin. These esters are obtained by reaction of ethylenediaminetetraacetic acid dianhydride and suitable alcohols. Specifically illustrated is the reaction between EDTA dianhydride and dodedycl alcohol to form the didocyl ester of EDTA. In a similar manner, the diethyl and dioctadecyl esters of EDTA are prepared.

DETAILED DESCRIPTION OF THE INVENTION

The novel products of the present invention are obtained by reacting EDTA anhydride with a large group of substances and generally, in preparing a monosubstituted derivative of EDTA anhydride, at least about 1 mole of reagent is used per mole of EDTA anhydride; in preparing the corresponding di-substituted derivative of EDTA anhydride, at least about 2 moles of reagent are used per mole of EDTA anhydride.

Unsymmetrical derivatives, i.e., compounds obtained by reacting EDTA anhydride with more than one reagent, are prepared by reacting 1 mole of EDTA anhydride with 1 mole of the first reactant, for example, N-methylamine, followed by reacting the monoamide thus obtained with 1 mole of a second reactant, i.e., morpholine, to produce the unsymmetrical product. The resulting products are characterized by a wide variety of uses and applications.

Generally, EDTA anhydride can be reacted with compounds having a hydrogen atom replaceable by an acyl function including compounds containing an oxygen, nitrogen, phosphorus or sulfur atom. Illustrative reactants are ammonia, amines, (primary and secondary amines as well as alkylamines and arylamines), alkanolamines such as ethanolamine, diethanolamine, tertiary alkanolamines, such as, for example, triethanolamine, tripropanolamine, N,N-dimethylethanolamine, N,N-diethylethanolamine, hydroxyethylpiperidine, hydroxymethylpiperidine, and the like; monoalkyl- and monoaryl hydroxylamines, dialkyl and diarylhydroxylamines including hydroxylamine per se; hydrazines including hydrazine per se, N,N-dialkylhydrazines such as, for example, dimethylhydrazine, diethylhydrazine, and the like; and diaryl hydrazines; primary or secondary amides such as formamide, acetamide, butyramide, N-methylacetamide and the like; diamines including ethylene diamine, para-phenylene diamine, and the like; dihydroxylamines such as 1,6-dihydroxylaminohexane, and the like; dihydrazines such as, for example, N,N'-dimethylhydrazine, 1,4-dihydrazinobutane; ureas and guanidines including N-alkyl- and aryl- substituted ureas or guanidines wherein the alkyl group contains up to 10 carbon atoms and the aryl group includes phenyl, naphthyl, tolyl, nitrophenyl, chlorophenyl or aralkyl such as phenethyl, and the like; cyclic N-compounds such as morpholines, piperidines, aziridines including substituted morpholine and piperidine compounds and illustratively, 4-ethylmorpholine, 3-chloromorpholine, 1,4-diazacyclohexane, and the like; imidazolines including substituted imidazolines; tetrahydrooxazoles, tetrahydrothiazoles, benzodiazepines, and the like; polyalkyleneamines such as polyethyleneamines, ethylene diamine, diethylene triamine, 1,5,9,13-tetraazatridecane, and the like; amino acids as glycine, β-alanine iminodiacetic acid, glutamic acid, and the like; alkylenediamine polycarboxylic acids such as, for example, ethylenediamine, mono-, di- or triacetic acids, and the like; amino and imino nitriles such as, for example, aminoacetonitrile, iminodiacetonitrile, and the like; hydroxy containing carboxylic acids such as, for example, glycolic acid, citric acid, tartaric acid, and the like; oxygen containing compounds such as phenols, cresols, including bis-phenol A, and polyols, glycols such as ethyleneglycol, propyleneglycol, butyleneglycol, and the like; sugars and polysaccharides such as dialkylaminoalkylphosphonates glucose, sucrose, starches, cotton, and the like; polyvinyl compounds such as polyvinyl alcohol, partially hydrolyzed polyvinyl acetate, and the like; dialkylaminoalkylphosphonates such as diethanolaminomethylphosphonate, dipropanolaminoethylphosphonate, and the like; aminoalkylphosphonic acids such as aminomethylphosphonic acid, beta-aminoethylphosphonic acids including esters, amides and derivatives thereof; N-methylol amides such as N-methylolformamide, N-methylolacetamide, and the like; N-methylolamines such as, for example N-methylolmelamine, N-methylolureas such as dimethylolurea, and the like. Other classes of compounds containing a sulfur or phosphorus atom with a hydrogen atom replaceable by an acyl group can also react with EDTA anhydride and include, for example, mercaptans and the like.

The products obtained by directly reacting EDTA anhydride with compounds having a hydrogen atom replaceable by an acyl function are represented by the following formulae:

I 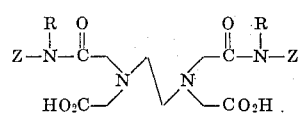

(these compounds are obtained by reacting EDTA anhydride with at least about 2 moles of a compound of the formula

or

II 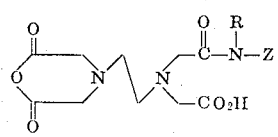

wherein
R is hydrogen, alkyl (containing up to 22 carbon atoms), substituted alkyl, (halo, nitro, vinyl, cyano, alkoxy, and the like), aryl (phenyl, naphthyl, anthracyl, and the like) substituted aryl (illustratively, nitro, halo, vinyl, cyano, alkoxy, and the like), peptide (such as, for example, tetraglycyl, polylysine, polyglutamic acid, and the like), substituted carboxyalkyl (i.e., glycyl, iminodiacetyl 2-amino-3-hydroxy succinic acid, and the like), carboxyalkyl, carbohydrates, mono- and poly- saccharides, heteroaryl and alkyl substituted heteroaryl (such as, for example, pyridyl, thenyl, quinolyl, and the like), cycloalkyl (containing up to 22 carbon atoms), cycloalkenyl containing from 4 to 12 carbon atoms, i.e., cyclobutene, cyclodecene, and the like, heterocycloalkenyl, heterocycloalkyl (piperazine, piperidine, morpholine, and the like), with the proviso that when R is cycloalkyl or heterocycloalkyl, Z & R are connected by an alkylene bridge (the heteroatoms being O, S, N, P, Si, As, Sn, Sb and Hg); and Z is hydrogen, alkyl (containing up to 22 carbon atoms), substituted alkyl (halo, nitro, vinyl, cyano, alkoxy, and the like), aryl (phenyl, naphthyl, anthracyl, and the like), substituted aryl (illustratively, nitro, halo, vinyl, cyano, alkoxy, and the like), peptide (such as, for example, tetraglycyl, polylysine, polyglutamic acid and the like,) substituted carboxyalkyl (i.e., glycyl, iminodiacetyl, 2-amino-3-hydroxysuccinyl, and the like) carbohydrates, mono- and poly- saccharides, carboxyalkyl, heteroaryl and alkyl substituted heteroaryl (such as, for example, pyridyl, thenyl, quinolyl, and the like), cycloalkyl (containing up to 22 carbon atoms), cycloalkenyl (containing from 4 to 12 carbon atoms, i.e., cyclobutene, cyclodecene, and the like,) heterocycloalkenyl, heterocycloalkyl (piperazine, piperidine, morpholine, and the like),

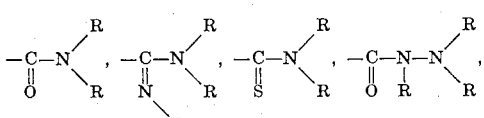

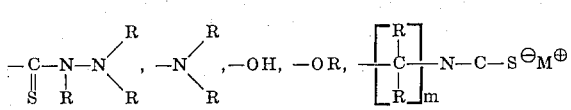

wherein
R is defined above,
$M^{\oplus}$ is an alkali or alkaline earth metal, and
$m$ is 0 to 20;

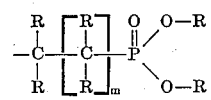

wherein R and $m$ are defined above
(these compounds are obtained by reacting EDTA anhydride with about 1 mole of a compound of the formula III 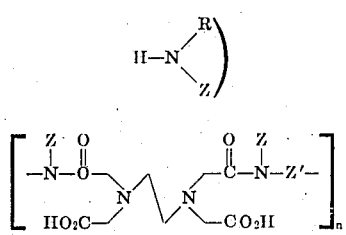

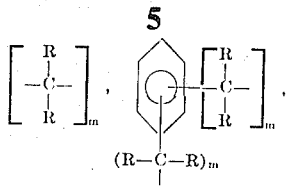

wherein Z' is

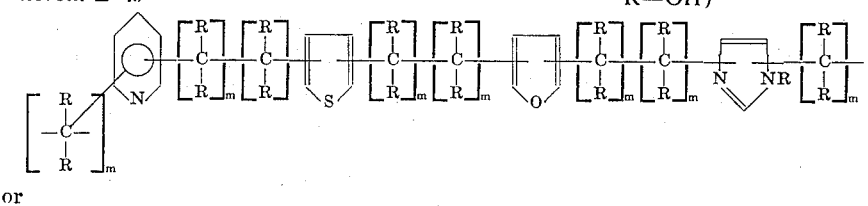

or

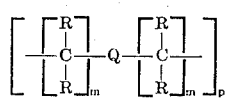

wherein R and Z are as defined above, n=1 to 10,000, p is 1 to 500 and Q is

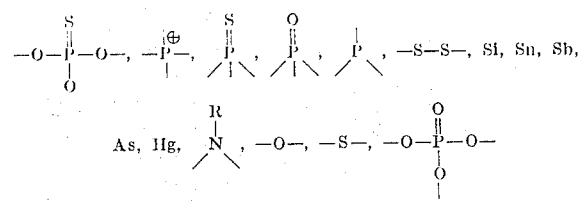

(These compounds are obtained by reacting EDTA anhydride with about 1 mole of a compound of the formula

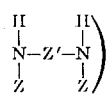

or

IV 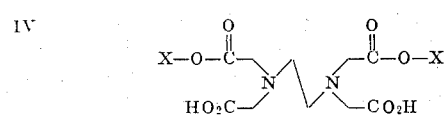

wherein X is substituted alkyl, (halo, nitro, vinyl, cyano, alkoxy, and the like), aryl (phenyl, naphthyl, anthracyl, and the like) substituted aryl (illustratively, nitro, halo, vinyl, cyano, alkoxy, and the like), peptide (such as, for example, tetraglycyl, polylysine, polyglutamic acid, and the like), substituted carboxyalkyl (i.e., glycyl, iminodiacetyl, 2-amino-3-hydroxy succinyl, and the like) heteroaryl and alkyl substituted heteroaryl (such as, for example, pyridyl, thenyl, quinolyl, and the like), cycloalkyl (containing up to 22 carbon atoms), cycloalkenyl containing from 4 to 12 carbon atoms, i.e. cyclobutene, cyclodecene, and the like, heterocycloalkenyl, heterocycloalkyl (piperazine, piperidine, morpholine, and the like), with the proviso that when R is cycloalkyl or heterocycloalkyl, Z & R are connected by an alkylene bridge (the heteroatoms being O, S, N, P, Si, As, Sn, Sb and Hg);
(these compounds are obtained by reacting EDTA anhydride with at least 2 mols of a compound of the formula X—OH)

or

V 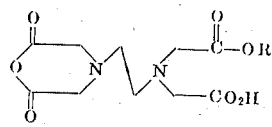

(these compounds are obtained by reacting EDTA anhydride with about 1 mol of a compound of the formula R—OH)

or

VI 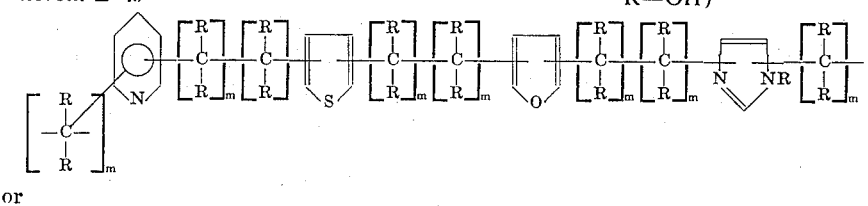

(these compounds are obtained by reacting EDTA anhydride with about 2 mols of a compound of the formula Y—OH)
wherein Y is hydroxyalkyl, polyhydroxyalkyl, (the alkyl group containing up to 22 carbon atoms), a monosaccharide, oligosaccharide and polysaccharide, a lignin sulfonate, polyflavonoid or

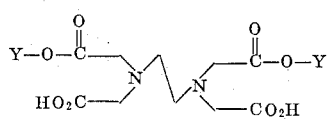

wherein R and m are defined above;

VII 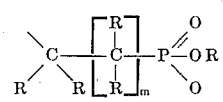

wherein Z' and n are defined above;
(these compounds are obtained by reacting EDTA anhydride with about 1 mol of a compound of the formula HO—Z'—OH)

or

VIII 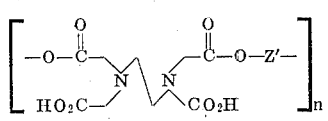

(these compounds are obtained by reacting EDTA anhydride with about 2 mols of a compound of the formula R—SH)

or

IX 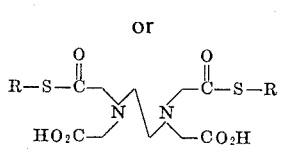

(these compounds are obtained by reacting EDTA anhydride with about 1 mol of a compound of the formula RSH)

or

X 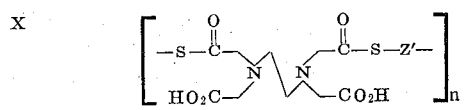

wherein R, Z' and n are defined above.
(these compounds are obtained by reacting EDTA anhydride with about 1 mol of a compound of the formula HS—Z'—SH).
Illustrative reaction products are
sym.-EDTA-bis-N,N-dimethylamide
sym.-EDTA-bis-N-hexylamide
sym.-EDTA-bis-N-phenylamide
sym.-EDTA-bis-N,N-di-($\beta$-hydroxyethyl)amide
sym.-EDTA-bis-glycineamide
sym.-EDTA-bis-iminodiacetic acid amide
EDTA ethylenediamine polyamide of the formula

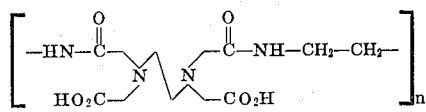

EDTA p-phenylenediamine polyamide of the formula

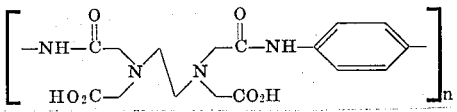

EDTA hexamethylenediamine polyamide of the formula

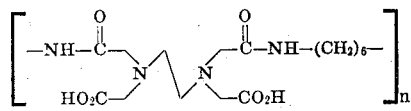

sym.-EDTA-bis-hydroxamic acid
EDTA 1,3-dihydroxylaminobenzene polyhydroxamic acid of the formula

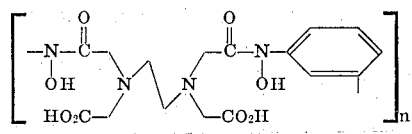

sym.-EDTA-bis-N,N-dimethylhydrazide
EDTA N,N'-dimethylhydrazine polyhydrazide, wherein R = R'= CH$_3$
sym.-EDTA-bis-guanidide
sym.-EDTA-bis-morpholide
EDTA piperazine polyamide of the formula

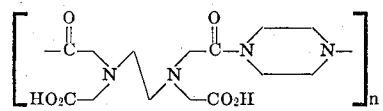

sym-EDTA-bis-N-ethyleneamide
sym-bis(1,2,3-tricarboxyisopropyl) ethylenediaminetetraacetate
sym-diphenyl ethylenediaminetetraacetate
sym-bis-(2,6-dimethylphenyl) ethylenediamintetraacetate
EDTA ethyleneglycol polyester of the formula

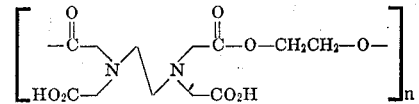

EDTA diethyl diethanolaminomethylphosphonate polyester of the formula

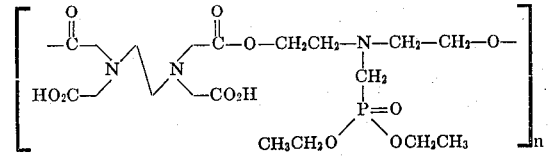

EDTA bis-phenol-A polyester of the formula

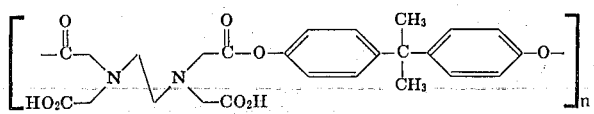

EDTA tartaric acid polyester of the formula

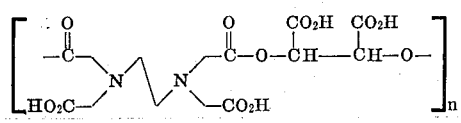

EDTA glucose polyester
EDTA cellulose polyester
sym.-EDTA-bis-ureide
sym.-EDTA-bis-thioureide
Sym.-EDTA-bis-(N-$\beta$-mercaptoethyl)amide
EDTA 3,4-dithia-1,6-diaminohexane polyamide

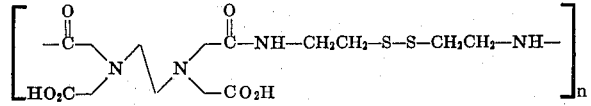

EDTA triethanolamine polyester
sym.-EDTA-bis-(tetraglycine)amide
sym.-EDTA-bis-(imidazoline)amide
sym.-EDTA-bis(N,N-ethylenediaminediacetic acid)-amide
EDTA N,N'-ethylenediaminediacetic acid polyamide of the formula

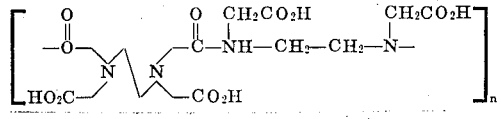

EDTA polyvinylalcohol polyester
sym.-bis-(N-methylolacetamido) ethylenediaminetetraacetate
sym.-bis-(N-salicylamido) ethylenediaminetetraacetate
sym.-bis-ethylmercapto ethylenediaminetetraacetate
sym.-bis(3-chlorophenylmercapto) ethylenediaminetetraacetate
EDTA ethylene dithiol polymercaptoester of the formula

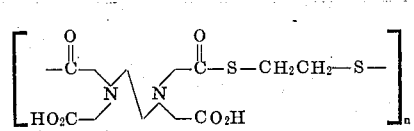

In the above formulae, the symbol

is intended to cover

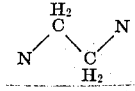

Amide products obtained by reacting EDTA anhydride with amines including substituted amines are useful generally as chelating agents, stabilizers, flame-retardants, metal stain removers (iron stains), scale removers from boilers, antistatic agents, pigment carriers, dye levelling agents, detergent builders, surfactants, agricultural chemicals, and the like. Polymers obtained by reacting EDTA with polymeric reactants are useful generally as chelating agents, antistats, coagulants (in water purification and waste disposal), flame-retardants, anti-redeposition agents, surfactants, chelating agents, detergent builders, stabilizers, curing agents, (e.g., for rubber), cross-linking agents, adhesives for metals (iron, copper, nickel including their alloys, and the like.

The following Examples detail the nature of the present invention but are not to be considered as limiting.

EXAMPLE I 2.40 g EDTA anhydride and 2.70 g of 2,6-dimethylphenol were heated together in 50 ml N-methylpyrrolidone for 14 hours. The product was poured into 250 ml water. After filtering and washing, there was obtained 2.5 g of sym.-bis(2,6-dimethylphenyl) ethylenediaminetetraacetate. The ester was recrystallized from methanol, M.P. 170° (decomp.)

EXAMPLE II

To 2.56 g EDTA anhydride was added 25 ml N-methylpyrrolidone and the mixture was heated to 55° C. resulting in a tan color solution. 3.84 g of citric acid was added to this solution and the reaction mixture was then maintained for two hours at 55° C. There was obtained a purple-brown reaction mixture. On standing in an ice bath, crystalline material was formed. This was filtered off, 100 ml benzene was added to the cooled mixture and there was obtained a gel-like white suspension. 50 ml hexane was added to this suspension and the resulting mixture was filtered. 2.3 g of the sym.-bis-citrate ester of EDTA was obtained as a tan solid. The infrared spectrum was consistent with the proposed structure.

EXAMPLE III

To 35 ml N-methyl-2-pyrrolidone was added 10.0 g EDTA anhydride and 2.25 g of ethylenediamine. The mixture was heated with stirring for 30 minutes at 100° C. The temperature was then raised to 120° C. and the reaction mixture was maintained at this temperature for another 30 minutes. The mixture was slowly cooled to room temperature and a large excess of acetone was then added. This was followed by filtering the solid formed and washing it with acetone. The solid polymer was dried and weighed and there was obtained a yield of 10.5 g of an EDTA-ethylene diamine polyamide.

EXAMPLE IV

To 20 ml of N-methyl-2-pyrrolidone was added 10.0 g EDTA anhydride and 2.42 g of ethyleneglycol. The mixture was heated with stirring at 120° for 45 minutes. Upon discovering unreacted anhydride, 20 ml of N-methylpyrrolidone and 0.5 g of ethyleneglycol was then added to the reaction mixture. Heating was continued overnight at a temperature of 50° C. accompanied by stirring. The mixture was then slowly cooled. Excess acetone was added thereto followed by filtering and washing three times. Upon drying, there was obtained a solid fine polymeric powder (a yield of 9.9 g) which was consistent with the structure of polyethylene ethylenediamine-tetraacetic acid sym-diacetate. (EDTA ethyleneglycol polyester).

The following Examples, i.e., Examples V–IX, illustrate the utility of EDTA-ethylenediamine polyamide as a chelating agent for various metals.

EXAMPLE V

To a test tube containing 1 ml of water was added about 30 Mg of cupric chloride dihydrate. The pH was brought up to 13 and a voluminous gelatinous precipitate was obtained. Upon the addition of a solution of about 100 mg of the EDTA-ethylenediamine polyamide (described in Example III supra) in 0.5 ml H₂O, the copper hydroxide rapidly re-dissolved.

EXAMPLE VI

To a test tube containing 1 ml of water, 30 mg cupric chloride dihydrate and 100 mg EDTA-ethylenediamine polyamide (described in Ex. III supra), there was added 50% NaOH solution until the pH was approximately 14. No precipitate was formed.

EXAMPLE VII

The procedure used in Example V supra was followed except for the use of cobalt chloride and nickel chloride. Similar results were obtained in Example V.

EXAMPLE VIII

To a test tube containing 30 mg of calcium carbonate in 1 ml H₂O was added EDTA-ethylenediamine polyamide until the precipitate dissolved. An additional quantity of sodium carbonate was added and the pH was brought up to 11. No precipitate was formed.

EXAMPLE IX

The procedure of Example VIII supra was repeated except for the use of magnesium carbonate instead of calcium carbonate. Similar results were obtained.

EXAMPLE X

The following Example illustrates the use of EDTA-ethylenediamine polyamide as a detergent builder.

In a screening procedure, a detergent base stock was prepared by milling together a surfactant, sodium metasilicate, carboxymethylcellulose, sodium sulfate and a minor amount of sodium tripolyphosphate. 1.5 g of this mixture was dissolved in 1 L. of wash water. To this solution was added 1 g of a builder candidate representing 40% of the total detergent system. This solution was used to launder a standard soiled cloth. Reflectance data for the laundered cloth is given below.

| Builder Additive | Soil Reflectance Change | Soil Redeposition Reflectance Change |
|---|---|---|
| none | 37.4 | −4.1 |
| sodium sulfate | 38.3 | −3.8 |
| sodium tripolyphosphate | 46.3 | −1.2 |
| EDTA-ethylenediamine polyamide | 47.0 | −1.6 |

Thus, the polyamide is as effective a detergent builder as the commercially used sodium tripolyphosphate.

EXAMPLE XI

To a solution of 2.56 g of EDTA anhydride in 10 ml of N-methylpyrrolidone is added 1.70 g of β-mercaptoethylamine. After removing the solvent and excess amine, the symmetrical bis (N-β-mercaptoethyl) amide of EDTA is obtained.

To an aqueous solution of the amide is slowly added dilute hydrogen peroxide until all the mercapto groups are converted to disulfide linkages. The resultant polymer is an effective brightener for the electrodeposition of copper. An example of the unique properties of this polymer is given below.

A stock plating bath is made up to the following specifications: 28 oz/gal of $CuSO_4 \cdot 5H_2O$, 8 oz/gal of concentrated $H_2SO_4$, and 150 cc/gal of 37% HCl.

Panels are plated in a Hull cell at 3 amperes which gives a plating range of current densities of 5–150 amps./sq.ft. Upon using the stock solution to electrodeposit a copper plate upon a standard panel (5 minutes plating time at room temperature), a lusterless matte copper deposit is obtained. If however the disulfide linked polyamide described above is added to the stock solution at a concentration of 0.008 oz/gal., a bright and lustrous deposit is obtained in the current density range of 5–100 amps./sq.ft.

EXAMPLE XII

To 2.56 g of EDTA anhydride in 10 ml of triethylamine is added 1.40 g of hydroxylamine hydrochloride. After reacting the mixture at room temperature for several days, the triethylamine hydrochloride is removed, the solvent distilled off and the symetrical-bis-dihydroxamic acid of EDTA is obtained.

The hydroxamic acid forms strong stable ferric chelates in the pH range 4–11.

EXAMPLE XIII

To 15 ml N-methylpyrrolidone is added 1.56 g EDTA anhydride and 2.55 g diethyl diethylaminomethylphosphonate. After reacting for 24 hours, the solution is cooled and a large excess of acetone is added. The polymer is filtered, washed with acetone, and vacuum dried.

When this polymer is deposited on cotton fabrics, it renders them flame resistant.

EXAMPLE XIV

To a solution of 2.56 g EDTA anhydride in 15 ml N-methylpyrrolidone was added 1.65 g glycine. The suspension was stirred at room temperature for 64 hours. After removing a small amount of residue by filtration, a large excess of diethyl ether was added to the filtrate. A sticky mass was formed. After decanting off the solvent, the semi-solid product was extracted several times with boiling ethanol. Sym.-EDTA-bis-glycineamide crystallized from the ethanol upon cooling. The amide product was characterized by a melting point of 134°–138° (decomp.) and the structure of the product was confirmed by its infrared and NMR spectra.

The starting materials and the molar ratios used to prepare various novel derivatives of EDTA, covered by the indicated formula, are set out in the following Tables: (In these Tables, the symbols R, X, Y, Z, and Z', are as defined above).

TABLE I

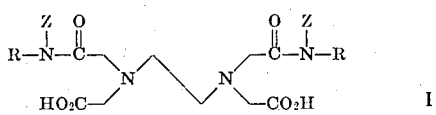

I

| Starting material reacted with EDTA anhydride $\left(HN\diagdown_R^Z\right)$ | Molar ratio $HN\diagdown_R^Z$ to EDTA anhydride | Product R | Z |
|---|---|---|---|
| n-Heptylamine | 2 | $CH_3(CH_2)_5-CH_2-$ | H |
| Dimethylamine | 2 | $CH_3-$ | $CH_3$ |
| N-phenylhydroxylamine | 2 | ⌬ | $-OH$ |
| Iminodiacetic acid | 2 | $-CH_2CO_2H$ | $-CH_2CO_2H$ |
| Iminodiacetonitrile | 2 | $-CH_2CN$ | $-CH_2-CN$ |
| N,N-dimethylhydrazine | 2 | $-H$ | $-N\diagdown_{CH_3}^{CH_3}$ |
| N,N-dimethylurea | 2 | $-H$ | $-\overset{O}{\underset{\|}{C}}-N\diagdown_{CH_3}^{CH_3}$ |
| Guanidine | 2 | $-H$ | $-\overset{NH}{\underset{\|}{C}}-NH_2$ |
| Piperidine | 2 | Z and R are $-(CH_2)_5-$ and are connected as an alkylene bridge | |

TABLE II

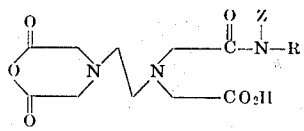
II

| Starting material reacted with EDTA anhydride $\begin{pmatrix} Z \\ HN \\ R \end{pmatrix}$ | Molar ratio $HN\begin{matrix}Z\\R\end{matrix}$ to EDTA anhydride | Product R | Z |
|---|---|---|---|
| p-Toluidine | 1 | —C$_6$H$_4$—CH$_3$ | H |
| di-n-Propylamine | 1 | CH$_3$CH$_2$CH$_2$— | CH$_3$CH$_2$CH$_2$— |
| N,N-dimethylhydrazine | 1 | H | —N(CH$_3$)$_2$ |
| N,N-diphenylhydrazine | 1 | H | —N(C$_6$H$_5$)$_2$ |
| Triglycine | 1 | H | —CH$_2$—C(O)—NH—CH$_2$—C(O)—NH—CH$_2$CO$_2$H |

TABLE III

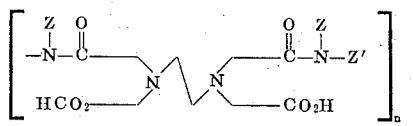
III

| Starting material reacted with EDTA anhydride $HN-Z'-N-H$ with Z substituents | Molar ratio $\begin{matrix}Z & Z\\HN-Z'-N-H\end{matrix}$ to EDTA anhydride | Product Z | Z' |
|---|---|---|---|
| Hexamethylenediamine | 1 | H | —(CH$_2$)$_6$— |
| N,N'-ethylenediaminediacetic acid | 1 | —CH$_2$CO$_2$H | —(CH$_2$)$_2$— |
| N,N'-dimethylethylenediamine | 1 | —CH$_3$ | —(CH$_2$)$_2$— |
| 3-oxa-1,5-diaminopentane | 1 | H | —CH$_2$CH$_2$—O—CH$_2$CH$_2$— |
| 4-thia-1,7-diaminoheptane | 1 | H | —CH$_2$CH$_2$CH$_2$—S—CH$_2$CH$_2$CH$_2$— |
| Hydrazine | 1 | H | H |
| 1,3-dihydroxylaminobenzene | 1 | —OH | —C$_6$H$_4$— |
| p-Phenylenediamine | 1 | H | —C$_6$H$_4$— |
| Piperazine | 1 | —CH$_2$CH$_2$— | —CH$_2$CH$_2$— |

TABLE IV

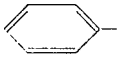

IV

| Starting material reacted with EDTA anhydride X—OH | Molar ratio of X—OH to EDTA anhydride | Product X |
|---|---|---|
| Phenol | 2 |  |
| Glycolic acid | 2 | —CH₂CH₂H |
| β-Hydroxyethyl-acetamide | 2 | —O—CH₂CH₂—NH—C(=O)—CH₃ |
| p-Nitrobenzyl alcohol | 2 | NO₂—⟨⟩—CH₂— |
| N,N-dimethylethanol-amine | 2 | (CH₃)₂N—CH₂CH₂— |
| β-Naphthol | 2 | 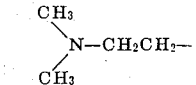 |

TABLE V

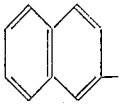

V

| Starting material reacted with EDTA anhydride R—OH | Molar ratio of R—OH to EDTA anhydride | Product R |
|---|---|---|
| Methanol | 1 | CH₃— |
| Heptadecanol | 1 | CH₃(CH₂)₁₅—CH₂— |
| Cyclohexene-3-ol | 1 | 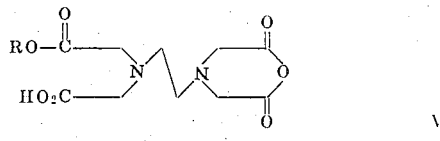 |
| m-Chlorophenol | 1 |  |
| Trifluoroethanol | 1 | CF₃—CH₂— |
| N-(β-hydroxyethyl)-morpholine | 1 | —CH₂CH₂—N⟨morpholine⟩ |
| 3-hydroxymethylthiophene | 1 | 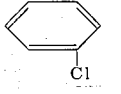 |

TABLE VI

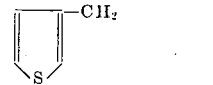

VI

| Reaction of EDTA anhydride with Y—OH | Molar ratio Y—OH/ EDTA anhydride | Product Y |
|---|---|---|
| Glucose | 2 | 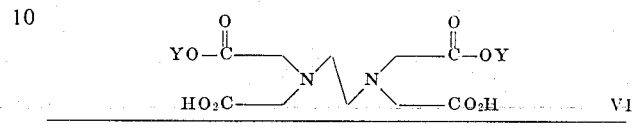 |
| Inosine | 2 | 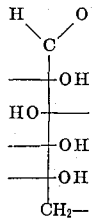 |
| Sucrose | 2 | 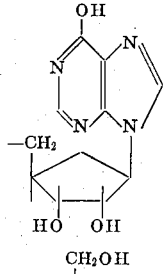 |
| Cellotetrose (tetrasaccharide from hydrolysis of cellulose) | 2 | tetra-β-1,4-glucosyl. |

TABLE VII

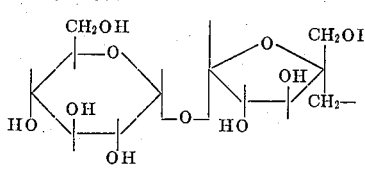

VII

| Reaction of EDTA anhydride with HO—Z′—OH | Molar ratio HO—Z′—OH to EDTA anhydride | Product Z′ |
|---|---|---|
| Diethyleneglycol | 1 | —CH₂CH₂—O—CH₂CH₂— |
| Hydroxy terminated polyoxyethylene | 1 | (CH₂CH₂—O—)ₙ— |
| bis-Phenol-A | 1 | 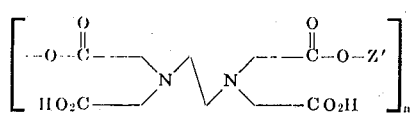 |
| Polyvinyl alcohol | 0.01–1 | —(CH₂—C(OH)—)ᵣ—(CH₂—CH—)ₜ— r=0–1000, t=1–1000 |
| Tartaric acid | 1 | —CH(CO₂H)—CH(CO₂H)— |
| Triethanolamine | 1 | 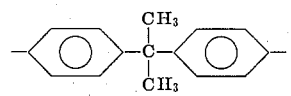 and 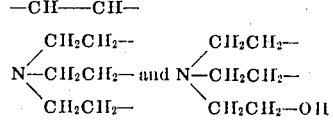 |

TABLE VIII

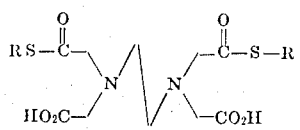

VIII

| Reaction of EDTA with R—SH | Molar ratio of RSH/EDTA anhydride | Product R— |
|---|---|---|
| Thioglycolic acid | 2 | —$CH_2CO_2H$ |
| Butylmercaptan | 2 | $CH_3CH_2CH_2CH_2$— |
| Thiophenol | 2 | —C₆H₅ |
| N-carbobenzoxycysteine | 2 | —$CH_2$—CH—$CO_2H$ \| NH \| C=O \| O \| $CH_2$ \| C₆H₅ |
| 4(5)-(mercaptopropyl) imidazole | 2 | $CH_2CH_2CH_2$— (imidazole) |

TABLE IX

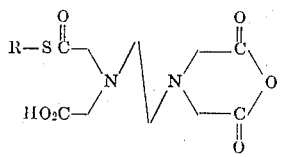

IX

| Reaction of EDTA anhydride with | Molar ratio of RSH/EDTA anhydride | Product R |
|---|---|---|
| Ethylmercaptan | 1 | $CH_3CH_2$— |
| Thiophenol | 1 | —C₆H₅ |
| N-Acetylpenicillamine | 1 | $CH_3$-C(=O)-NH-CH($C(CH_3)_2$)-$CO_2H$ |
| 3-chloropropylmercaptan | 1 | $ClCH_2CH_2CH_2$— |
| β-dimethylaminomercapto-ethane | 1 | $(CH_3)_2N$-$CH_2CH_2$— |

TABLE X

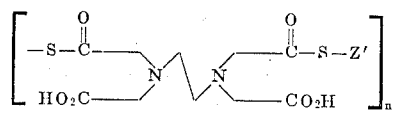

X

| Reaction of EDTA anhydride with | Molar ratio of HS—Z—SH to EDTA anhydride | Product —Z'— |
|---|---|---|
| 1,3-propanedithiol | 1 | —$CH_2CH_2CH_2$— |
| 4,4'-dimercaptobiphenyl | 1 | biphenylene |
| dipentene dimercaptan (Phillips Petroleum) | 1 | (cyclohexyl with $CH_3$, $CH_2$, $CH(CH_3)$ substituents) |
| 1,5-dimercapto-3-oxa-pentane | 1 | —$CH_2CH_2OCH_2CH_2$— |

The invention has been described with respect to certain preferred embodiments and various modifications and variations thereof will become obvious to persons skilled in the art. It is therefore to be understood that such modifications and variations are to be included within the spirit and scope of this invention.

We claim:

1. Ethylenediaminetetraacetic acid anhydride derivatives of the fromulae:

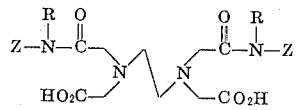

wherein Z is hydroxyl and R is hydrogen, alkyl, aryl, cycloalkyl or cycloalkenyl.

2. An ethylenediamine tetraacetic acid anhydride derivative according to claim 1 which is the symmetrical-bisdihydroxamic acid of ethylenediamine tetraacetic acid.

* * * * *

UNITED STATES PATENT AND TRADEMARK OFFICE
CERTIFICATE OF CORRECTION

PATENT NO. : 3,859,337
DATED : January 7, 1975
INVENTOR(S) : Jack L. Herz and Stanley Chaberek It is certified that error appears in the above-identified patent and that said Letters Patent are hereby corrected as shown below:

Column 1, line 68

Change "dodedycl" to -- dodecyl --;

Column 2, line 59

After "acids" insert -- such --;

Column 3, line 3

Delete "dialkylaminoaklylphosphonates";

Column 4, line 35

Delete " 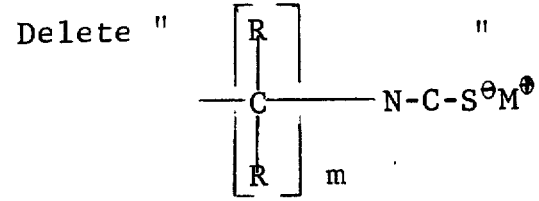 "

and insert 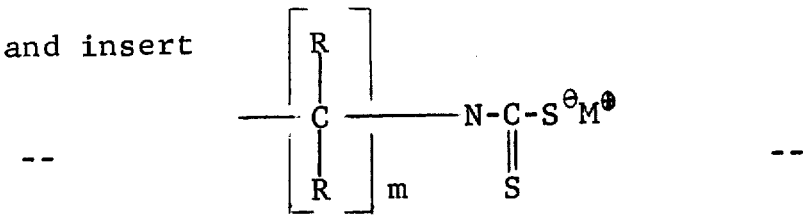 --

UNITED STATES PATENT AND TRADEMARK OFFICE
CERTIFICATE OF CORRECTION

PATENT NO. : 3,859,337                                    Page - 2 -
DATED : January 7, 1975
INVENTOR(S) : Jack L. Herz and Stanley Chaberek It is certified that error appears in the above-identified patent and that said Letters Patent are hereby corrected as shown below:

Column 4, line 69

After last formula, Column 4, insert -- wherein Z' is --

Column 5, line 8

Delete "wherein Z' is"

Column 5, line 10 (second formula)

Delete: " 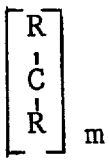 " third occurrence and insert therefor -- 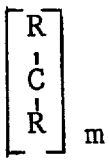$_m$

Column 8, formula opposite line 40, left-hand portion thereof

Delete "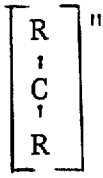"

and insert --  --

UNITED STATES PATENT AND TRADEMARK OFFICE
CERTIFICATE OF CORRECTION

PATENT NO. : 3,859,337                                                                      Page - 3
DATED : January 7, 1975
INVENTOR(S) : Jack L. Herz and Stanley Chaberek It is certified that error appears in the above—identified patent and that said Letters Patent are hereby corrected as shown below:

Column 9, line 15

After "alloys," insert -- ) --

Column 10, line 66

Change "38.3" to -- 38.8 --

Column 12, line 33

Delete "formula" and insert in lieu thereof -- formulae --

Column 16, between lines 40-45

After "cellulose." insert -- ) --

Column 16, line 58

Delete "0.01-1" and insert -- 0.01 to 1 --.

Column 17, line 24

After 4(5)- delete "(mercaptopropyl)" and insert -- ($\gamma$-mercaptopropyl) --

UNITED STATES PATENT AND TRADEMARK OFFICE
CERTIFICATE OF CORRECTION

PATENT NO. : 3,859,337                                    Page - 4
DATED       : January 7, 1975
INVENTOR(S) : Jack L. Herz and Stanley Chaberek It is certified that error appears in the above-identified patent and that said Letters Patent are hereby corrected as shown below:

Column 18, line 11

After "4,4'-dimercaptobiphenyl..        1" delete formula:

" 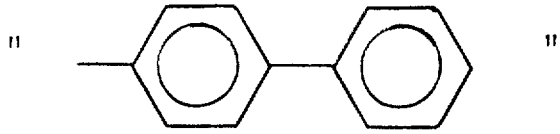 "

and insert -- 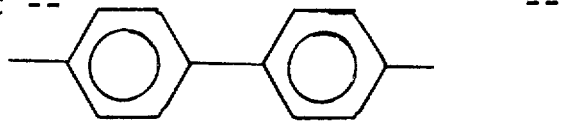 --

Column 18, line 12

After "dipentene dimercaptan
        (Phillips Petroleum).   1"   delete formula:

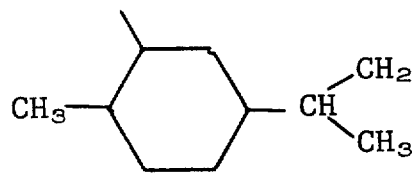

and insert -- 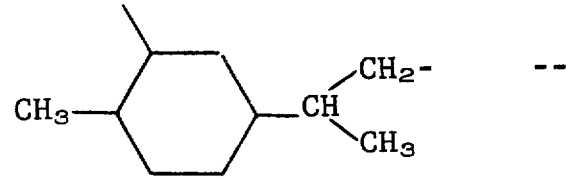 --

Signed and Sealed this sixth Day of January 1976

[SEAL]

Attest:

RUTH C. MASON                          C. MARSHALL DANN
*Attesting Officer*                    *Commissioner of Patents and Trademarks*